United States Patent [19]

Yasui

[11] Patent Number: 5,141,069
[45] Date of Patent: Aug. 25, 1992

[54] STEERING MECHANISM WITH TOE-IN CONTROL

[75] Inventor: Yoshiyuki Yasui, Davis, Calif.

[73] Assignee: Aisin Seiki Kabushiki Kaisha, Kariya, Japan

[21] Appl. No.: 524,073

[22] Filed: May 16, 1990

Related U.S. Application Data

[63] Continuation-in-part of Ser. No. 475,899, Feb. 6, 1990, which is a continuation-in-part of Ser. No. 243,822, Sep. 13, 1988, Pat. No. 4,941,097.

[51] Int. Cl.⁵ .............................................. B62D 17/00
[52] U.S. Cl. .................................. 180/79.1; 180/132; 180/140; 180/141; 180/148; 280/91; 280/661
[58] Field of Search .............. 180/132, 140, 141, 148, 180/79.1, 142, 143; 280/661, 668, 675, 90, 91; 364/424.05

[56] References Cited

U.S. PATENT DOCUMENTS

| 3,486,752 | 7/1969 | Fonda . | |
|---|---|---|---|
| 3,498,630 | 3/1970 | Crawford | 280/661 |
| 3,716,110 | 2/1973 | Fonda . | |
| 3,866,706 | 2/1975 | Lincke et al. . | |
| 4,049,961 | 9/1977 | Marcy . | |
| 4,144,948 | 3/1979 | Sergay . | |
| 4,418,780 | 12/1983 | Ito et al. . | |
| 4,440,254 | 4/1984 | Shibahata et al. . | |
| 4,441,572 | 4/1984 | Ito et al. . | |
| 4,534,577 | 8/1985 | Howard . | |
| 4,540,059 | 9/1985 | Shibahata et al. . | |
| 4,546,839 | 10/1985 | Noguchi . | |
| 4,634,135 | 1/1987 | Nakata et al. . | |
| 4,666,013 | 5/1987 | Shibahata et al. . | |
| 4,705,131 | 11/1987 | Shibahata et al. . | |
| 4,706,771 | 11/1987 | Kawabe et al. . | |
| 4,708,220 | 11/1987 | Noto et al. . | |
| 4,717,175 | 1/1988 | Arai et al. | 280/661 |
| 4,718,685 | 1/1988 | Kawabe et al. . | |
| 4,726,603 | 2/1988 | Sugiyama et al. | 280/661 |
| 4,741,409 | 5/1988 | Westerkamp et al. | 180/140 |
| 4,747,614 | 5/1988 | Kuroyanagi et al. | 280/661 |
| 4,758,053 | 7/1988 | Yasuno . | |
| 4,759,419 | 7/1988 | Nagae et al. . | |
| 4,771,846 | 9/1988 | Venable et al. . | |
| 4,773,012 | 9/1988 | Ito et al. . | |
| 4,796,720 | 1/1989 | Bauer | 280/661 |
| 4,823,898 | 4/1989 | Ogura et al. . | |
| 4,828,063 | 5/1989 | Ogura et al. . | |
| 4,881,749 | 11/1989 | Bausch | 280/661 |
| 4,902,032 | 2/1990 | Krehan et al. | 280/661 |
| 4,941,542 | 7/1990 | Tomoda et al. | 180/140 |

FOREIGN PATENT DOCUMENTS

| 0054776 | 2/1981 | European Pat. Off. . |
| 0089631 | 3/1983 | European Pat. Off. . |
| 0150303 | 11/1984 | European Pat. Off. . |
| 2203295 | 3/1988 | United Kingdom . |

OTHER PUBLICATIONS

Adaptive Steering, Bendix Technical Journal, Autumn 1969.

Primary Examiner—Mitchell J. Hill
Attorney, Agent, or Firm—Banner, Birch, McKie & Beckett

[57] ABSTRACT

The steering stability of a moving vehicle is maintained by measuring an actual yaw rate of the vehicle and determining a desired yaw rate of the vehicle and producing an output signal in response to a comparison of the actual and desired yaw rates. The steering angle of steerable wheels of the vehicle is controlled in response to the output signal in a manner tending to substantially conform the actual yaw rate to the desired yaw rate, thereby maintaining vehicle stability. The steerable wheels are steered by a steering wheel, and are independently steered by a motor in response to the output signal. That motor comprises a fluid motor. A toe-in control mechanism is also disclosed and functions to eliminate toe-in whenever the vehicle is steered through a turn.

34 Claims, 13 Drawing Sheets

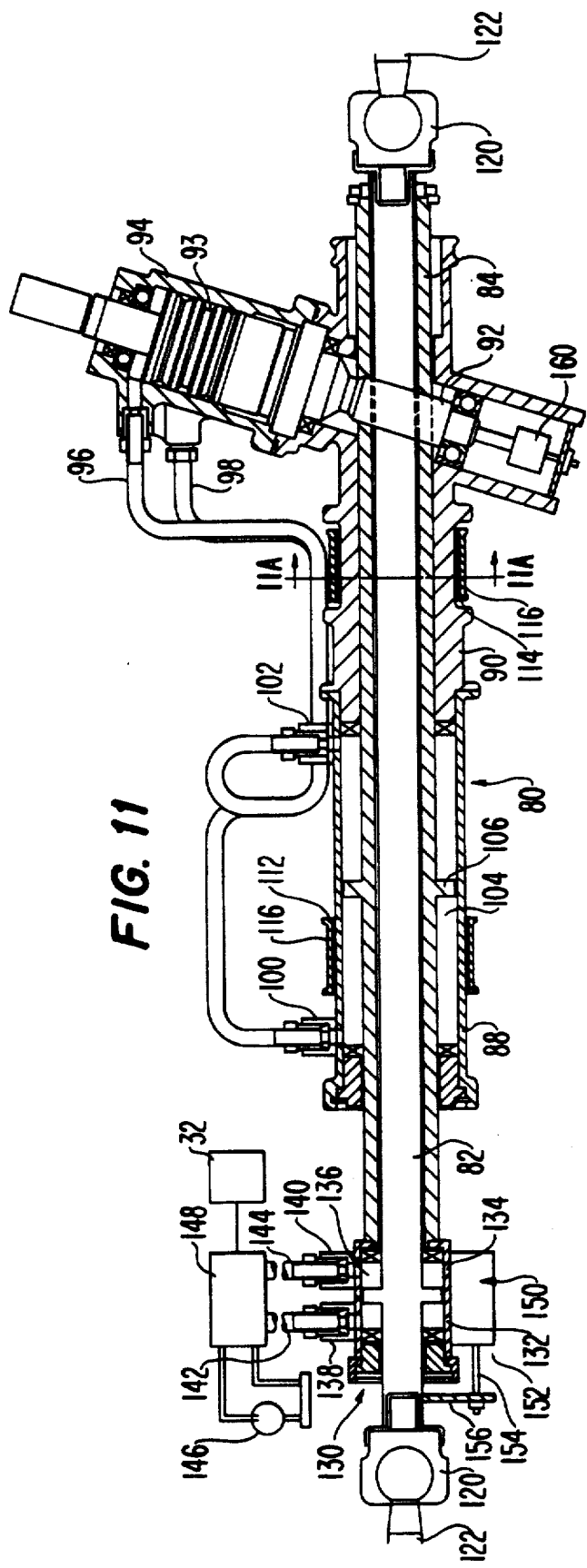

STEERING MECHANISM WITH TOE-IN CONTROL

RELATED INVENTIONS

This is a continuation-in-part of U.S. Pat. application Ser. No. 07/475,899, filed Feb. 6, 1990, which is a continuation-in-part of U.S. Pat. application Ser. No. 07/243,822, filed Sep. 13, 1988 now U.S. Pat. No. 4,941,097 issued Jul. 10, 1990.

BACKGROUND OF THE INVENTION

1. Field of the Invention

The present invention generally relates to an apparatus for providing steering to a vehicle, and more particularly, to an apparatus for providing toe-in control to a vehicle. Additionally, the invention is directed to providing toe-in control for a vehicle including an apparatus for providing steering stability to a vehicle.

2. Description of the Prior Art

When an automobile is moving essentially straight ahead, it is desirable that the steered front wheels be angled slightly towards each other such that the wheels are closer to each other at the front of the pair than at the back. This arrangement, which is known as toe-in, provides increased stability for the vehicle. However, when the vehicle is required to execute a turn, the toe-in of the front wheels tends to counteract the steering control such that the automobile does not traverse upon the desired turning path. Therefore, in the prior art, if it was desired to obtain increased vehicular stability during straight-ahead driving by providing toe-in, the maneuverability of the automobile would have to be compromised.

Additionally, during vehicle motion, such as cornering, for example, vehicle handling dynamics are affected by various parameters such as road conditions, tire characteristics, weight distribution, braking, accelerating, and the like, which can lead to oversteer or understeer conditions. In an effort to deal with this problem and attempt to maintain vehicle handling dynamics constant, there have been heretofore proposed complex suspension link systems, drive train arrangements, and braking systems. However, such proposed systems involve relatively numerous parts which undesirably increase the complexity and size of the system.

SUMMARY OF THE INVENTION

The present invention is directed to a toe-in control mechanism for use with a vehicle steering apparatus. The steering apparatus includes a laterally movable steering rod, and the steerable wheels of the vehicle are linked to the ends of the steering rod. The toe-in control mechanism includes a housing disposed adjacent to at least one end of the steering rod. A linking element is disposed within the housing and is linked at one end to one steerable wheel and at the other end to the steering rod. The linking element is movable in the lateral direction relative to the steering rod. The mechanism further includes an actuating mechanism which causes the linking element to move towards the steering rod when the vehicle is caused to turn by the steering apparatus such that the movement of the linking element towards the steering rod decreases the overall distance along the axis of the steering rod between the steerable wheels and thereby eliminates toe-in.

In a further embodiment one housing is disposed adjacent and connected to each end of the steering rod. Each of the housings is associated with a separate linking element and an actuating mechanism.

In a further embodiment a piston is disposed about the linking element, such that the piston defines a fluid chamber on one side thereof within the housing. A compressible element is disposed between the second side of the piston and an inner wall of the housing. Additionally, the actuating mechanism includes a fluid pressure source in fluid communication with the fluid chamber and providing increased fluid pressure to the chamber when the vehicle is caused to turn by the steering mechanism such that the piston moves laterally, compressing the compressible element and moving the linking element towards the steering rod, and thereby decreasing toe-in.

In a further embodiment, the invention is directed to a steering apparatus including a toe-in control mechanism. The steering rod is disposed within a rack housing and is laterally moveable relative thereto. Two pistons are disposed in the housing, one at the end of the steering rod and the other at the end of the linking element to create two fluid chambers. The compressible element is disposed between the pistons. The apparatus further includes a control element which detects when the vehicle is turning and which measures an actual steering condition of the vehicle and determines a desired steering condition of the vehicle. When the control element detects that the vehicle is turning, it causes a fluid pressure source to pressurise both chambers to a predetermined minimum threshold value so as to cause the pistons to move towards each other and compress the compressible element therebetween, thereby eliminating toe-in. Additionally, when the actual steering condition differs from the desired steering condition, the control element causes the fluid pressure source to further pressurise one chamber with respect to the other, thereby causing both the steering rod and the linking element to move jointly relative to the rack to maintain steering stability.

The present invention allows for the vehicle to be in a toe-in configuration during normal straight-ahead driving, while eliminating toe-in when the vehicle turns. Thus, vehicle stability is provided without loss of maneuverability. Additionally, the present invention provides for understeer and oversteer correction during turns, while still allowing for the increased stability provided by toe-in during straight-ahead driving.

BRIEF DESCRIPTION OF THE DRAWINGS

The objects and advantages of the invention will become apparent from the following detailed description of the preferred embodiments thereof in connection with the accompanying drawings in which like numerals designate like elements, and in which:

FIG. 11 is a longitudinal sectional view through a first mechanism operating in accordance with the second embodiment disclosed in connection with FIGS. 9–10.

FIG. 11A is a cross-sectional view taken along the line 11A—11A in FIG. 11.

FIG. 11B is a cross-sectional view depicting the manner in which a steering pinion engages a rack in the embodiment shown in FIG. 11.

DETAILED DESCRIPTION OF THE PREFERRED EMBODIMENTS

Figure 1A:
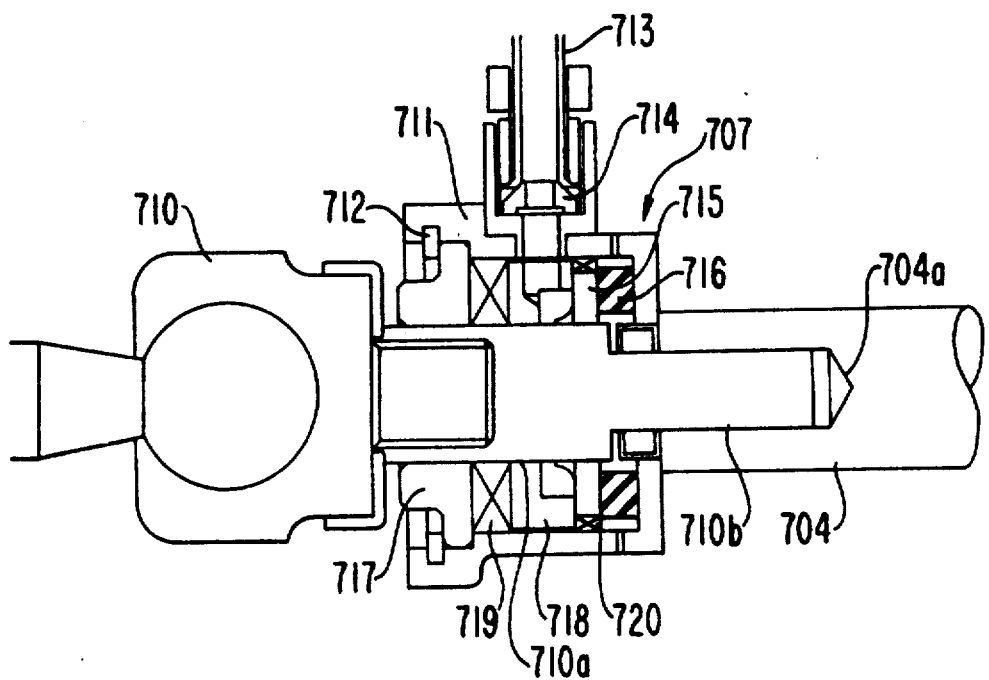
FIG. 1a is a cross-sectional view of a toe-in control mechanism according to the invention.
Figure 1B:
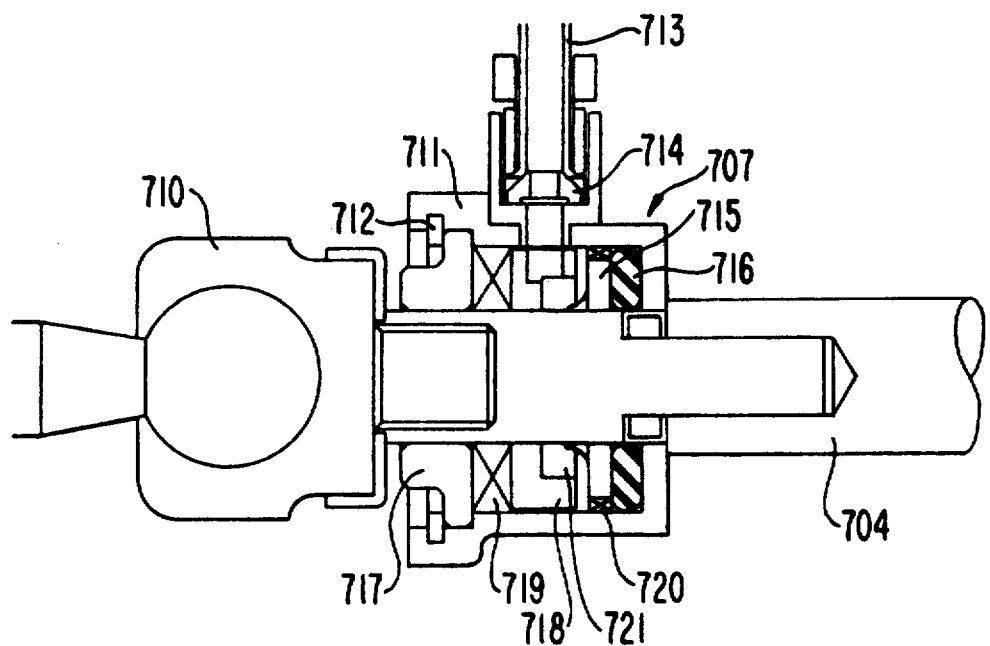
FIG. 1b is a view of the same mechanism shown in FIG. 1a in which the toe-in control is in a second operating state.

With reference to FIGS. 1a, 1b, 2a and 2b, a first embodiment of a toe-in control mechanism according to the present invention is disclosed. Steering rod 704 includes toe-in control mechanism 707 including hollow cylindrical housing 711 disposed on both ends. Steering rod 704 would be linked to further elements of a conventional steering mechanism, for example, steering rod 704 could include a rack portion thereon and be disposed for lateral movement within steering gear housing 706. A conventional pinion gear would be disposed within housing 706 so as to intermesh with the rack portion. The pinion gear would be further linked to steering wheel 705 such that rotation of steering wheel 705 would result in rotation of the pinion gear, causing lateral movement of steering rod 704 with respect to housing 706.

Ball joints 710 are linked to the ends of steering rod 704 by linking rods 710a which are disposed through cylindrical housing 711 and which include integrally formed linking rods or linking portions 710b extending exteriorly of housing 711 and into slots 704a formed in the ends of steering rod 704. Ball joints 710 are moveable for a small distance with respect to cylindrical housings 711. Similarly, linking rods 710a are moveable within cylindrical housings 711, and portions 710b are moveable within slots 704a. Ball joints 710 are linked at their other ends to drag links 703 which are further linked by steering arms 702 to steerable wheels 701.

Piston 715 is fixedly disposed about linking rod 710a within hollow cylindrical housing 711. A compressible element, for example, elastic member 716 is disposed between the inner wall of housing 711 and one side of piston 715, and stopper 718 is disposed about linking rod 710a, on the opposite side of piston 715 from elastic member 716. Annular chamber 721 is thereby formed about linking rod 710a, between piston 715 and stopper 718. Seal ring 720 is disposed about piston 715, and bushing 717 is disposed at the end of cylindrical housing 711 which is opposite the inner wall and is held in position by snap ring 712. Bushing 717 is disposed about the end of linking rod 710a and closes the open end of cylindrical housing 711. Annular oil seal 719 is disposed between bushing 717 and stopper 718. Cylindrical housing 711 further includes an aperture therethrough in which union seat 714 is disposed. Union seat 714 is linked by fluid line 713 to a source of fluid pressure which is not shown. Pressurized fluid may flow through fluid line 713 from the pressure source and through union seat 714 and into chamber 721. Both the fluid pressure source and the central control element which controls the flow of fluid therefrom are not shown but could comprise similar elements which are shown and discussed below with respect to FIGS. 9–10. Cylindrical housing 711 and all of the elements disposed therein jointly comprise toe-in control mechanism 707.

In normal driving operation, when the vehicle moves straight ahead, increased fluid pressure is not supplied to chamber 721. Elastic member 716 is in its expanded state as shown in FIG. 1a, and biases piston 715 to the left. Thus, linking rod 710a is biased into the left position such that an equivalent gap is maintained between ball joint 710 and the outer wall of cylindrical housing 711. Of course, the same gap would be maintained between ball joint 710 and housing 711 which are displayed on the right side of rod 704 and which are not shown. Since in this situation the overall length of the steering apparatus between the steerable wheels, including rod 704, cylindrical housing 711 and ball joint 710 is at its maximum, steerable wheels 701 are pivoted slightly inwardly towards each other and assume the toe-in position shown in FIG. 2a.

Figure 4:
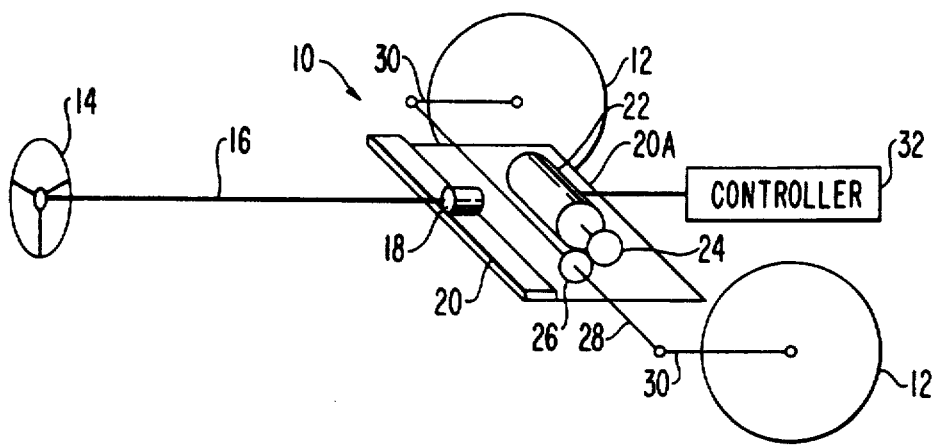
FIG. 4 is a schematic perspective view of a first embodiment of a steering apparatus for steering the steerable wheels of a vehicle in accordance with the present invention in which toe-in control is not provided.
Figure 5:
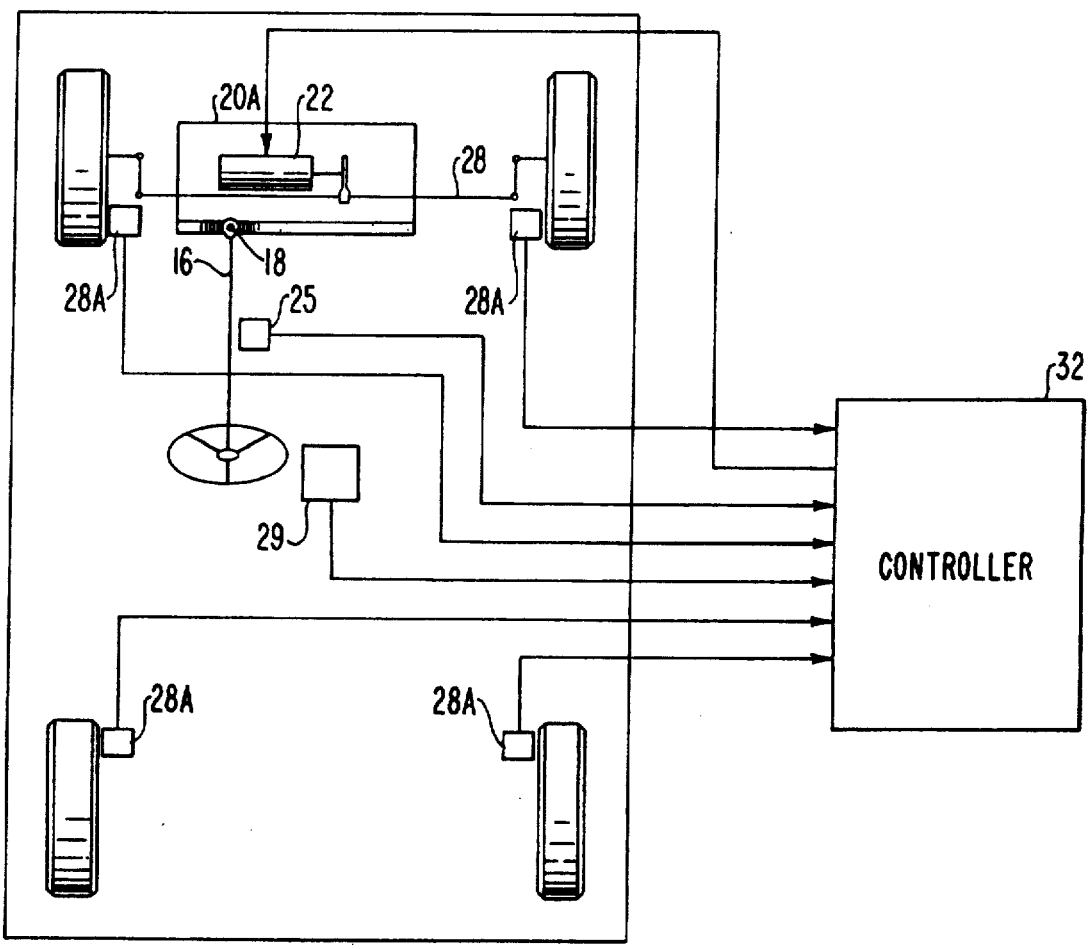
FIG. 5 is a schematic diagram of a first embodiment of a system for controlling the steering apparatus shown in FIG. 4.

However, when the steering wheel is rotated when it is desired to turn the vehicle, the rotation would be detected be a steering angle sensor, for example sensor 25 shown in FIG. 4. The steering angle sensor provides an output signal to indicate that the vehicle is undergoing a steering motion, and this signal is detected by a central processing unit, for example, controller 32 shown in FIG. 9. The central processing unit issues a command for increased fluid pressure to be supplied from the fluid source, for example, pump 60 and a reservoir as shown in FIG. 10, to annular chamber 721 within each housing 711. The increased pressure in chamber 721 forces piston 715 to move towards the right in FIG. 1b, compressing elastic member 716 until it assumes the position shown in FIG. 1b. Of course, the piston displayed in the right side cylinder 711 would simultaneously move to the left. Movement of both pistons 715 causes corresponding movement of linking rods 710a towards steering rod 704, pulling ball joints 710 closer to cylindrical housing 711, and thereby decreasing the overall length of the steering apparatus between the steerable wheels. Thus, steered wheels 701 pivot slightly outward with respect to each other and assume the nearly parallel arrangement shown in FIG. 2b. Toe-in is thereby eliminated at the initiation of a turn, and the maneuverability of the vehicle during turns is preserved even though toe-in is provided during straight ahead driving.

After the elimination of toe-in, pivoting motion for normal turning is provided to the steerable wheels due to lateral movement of steering rod 704 which is transferred to linking rods 710a in two different ways, for each wheel, depending on whether the vehicle is being turned to the right or the left. For the left-side housing 711 shown in the figures, when steering rod 704 is moved laterally to the left, the lateral motion of steering rod 704 is further transferred to linking rod 710a through housing 711 which is fixed to steering rod 704, compressible member 716, and piston 715. The movement of linking rod 710a is further transferred to the steerable wheel through ball joint 710 fixed thereto, steering arm 702 and drag link 703. For the right-side housing 711, lateral motion of steering rod 704 is transferred to linking rod 710a through housing 711, snap ring 712, bushing 717, oil seal 719, stopper 718, the fluid pressure in chamber 721 and piston 715. Of course, the opposite transference of motion takes place for each housing when the steering rod is moved to the right. After steering wheel 705 is rotated back to a position in which the vehicle is steered generally straight-ahead, the increased fluid pressure within chamber 721 is released back to the reservoir, and element 716 expands, forcing pistons 715 in the opposite direction such that linking rods 710a move away from steering rod 704. The overall length of the steering apparatus is thereby increased, and toe-in is restored.

Figure 2A:
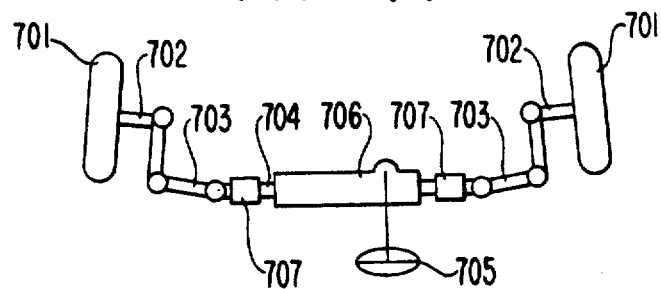
FIG. 2a is an overall view of a steering apparatus employing the toe-in control mechanism shown in FIG. 1a and in which the vehicle is moving straight ahead.
Figure 2B:
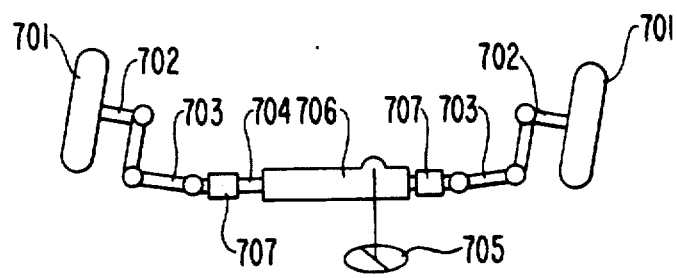
FIG. 2b is an overall view of the same steering apparatus shown in FIG. 2a in which the vehicle is turning.
Figure 3:
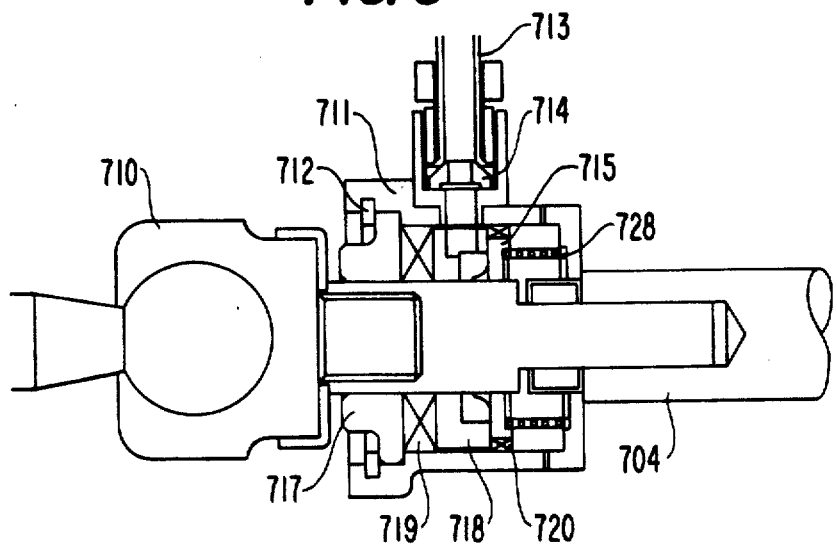
FIG. 3 a cross-sectional view of a toe-in control mechanism according to a second embodiment of the invention.

FIG. 3 illustrates a second embodiment of the toe-in control mechanism in which elastic element 716 is replaced by spring member 728. In all other aspects the structure and operation of the toe-in control mechanism is essentially the same as that described with regard to FIGS. 1a, 1b, 2a and 2b.

Depicted in FIG. 4 is a steering control apparatus 10 for a vehicle which includes a pair of steerable wheels 12 operably connected to a steering wheel 14 by means of a steering mechanism. The steering mechanism is of the rack and pinion type wherein the steering shaft 16 carries a pinion 18 which meshes with teeth on a reciprocable rack 20. Fixed on an extension 20A of the rack is an electric motor housing 22. The motor includes an output shaft which drives an output gear 24. The output gear meshes with a helical thread of a nut 26 which is fixed to a tie rod 28. The ends of the tie rod 28 are connected to a pair of steering arms 30 which transmit steering motion to the steerable wheels 12.

Thus, in practice, the shaft 16 and pinion produce linear movement of the rack 20 and rack extension 20A, and such linear movement is transmitted to the motor housing and output gear 24. The latter produces a linear movement of the nut 26 due to the meshed coupling between the output gear 24 and the nut 26. Linear movement of the nut 26 is transmitted directly to the tie rod 28. In this fashion, the orientation of the wheels 12 can be varied by turning the steering wheel.

In order to prevent excessive oversteer or understeer, the present invention enables the wheel orientation to be adjusted independently of the position of the steering wheel by actuation of the motor 22 to produce rotation of the output gear 24 and a resulting linear movement of the nut 26 and tie rod 28. Thus, augmented or adaptive steering control may be provided in order to ensure that the vehicle travels on the desired path.

Actuation of the motor 22 is produced by electrical signals from a controller 32 which utilizes signals dependent upon steering angle and vehicle speed to determine a desired yaw rate, and compares that desired yaw rate to an actual yaw rate to control the tire angle. Yaw rate can be defined as the rate of rotation of the vehicle about a vertical axis.

Figure 6:
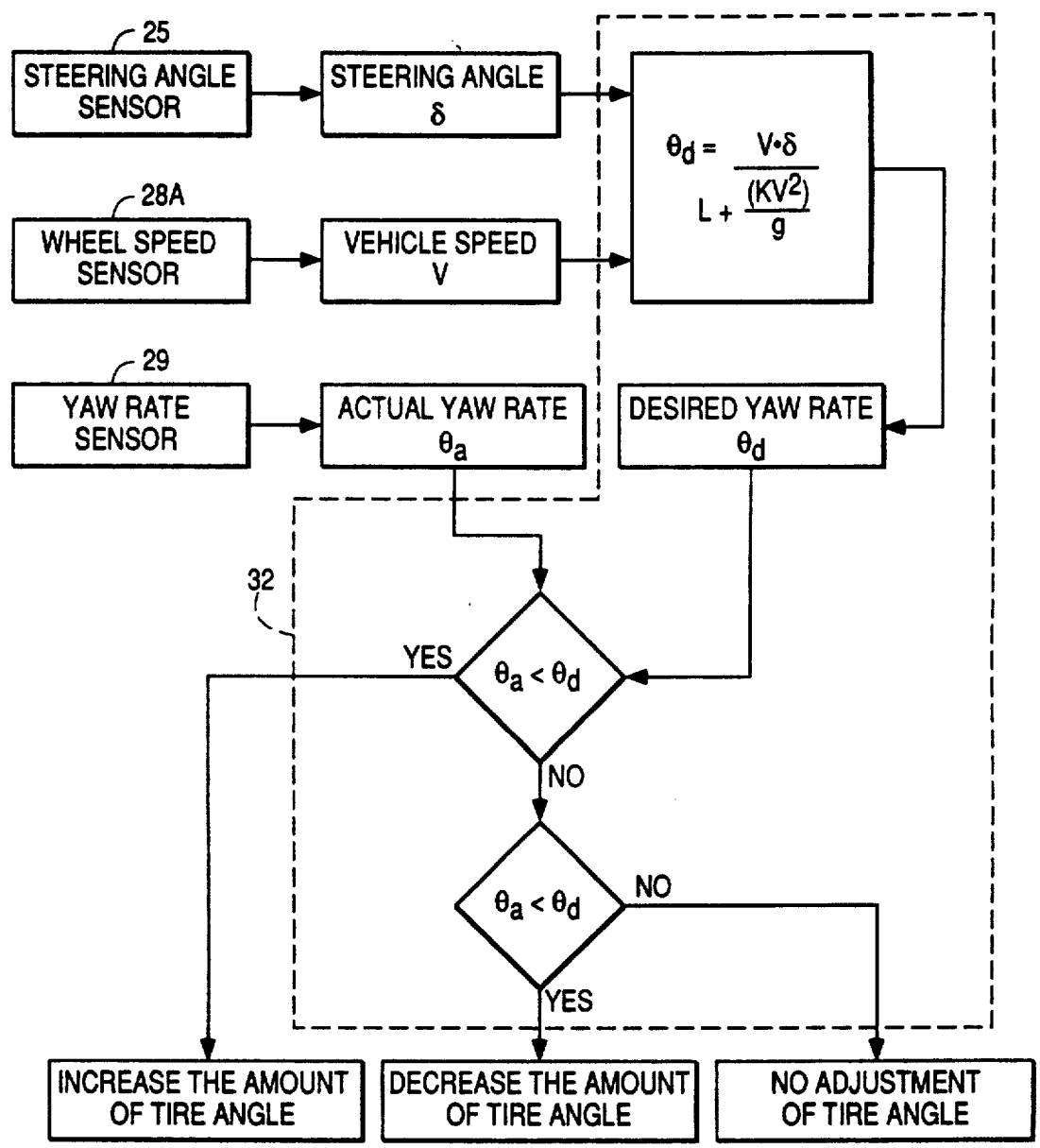
FIG. 6 is a flow chart for the system shown in FIG. 5.

Referring to FIG. 6, steering angle signal δ is provided by a conventional steering wheel angle sensor 25 which is operably connected to the steering shaft 16 of the vehicle. The vehicle speed signal V is provided by conventional wheel speed sensors 28A operably connected to all ground wheels of the vehicle. If the wheel speeds are different, the controller will obtain an average thereof. An actual yaw rate is measured by a conventional yaw rate sensor such as a gyro 29.

A desired yaw rate ($\theta_d$) is calculated by the controller in accordance with the relationship:

$$\theta_d = \frac{V \cdot \delta}{L + \frac{(KV^2)}{g}}$$

where $\theta_d$ is the desired yaw rate, L is the length of the wheel base of the vehicle (i.e., the distance between the front and rear axles), g is acceleration due to gravity, δ is the steering angle, V is vehicle speed, and K is a constant greater than 0 and no greater than 1 degree in order to achieve a neutral or slight understeer condition.

After determining the desired yaw rate $\theta_d$ in the above manner, the controller compares the desired yaw rate value with the actual yaw rate $\theta_a$. When $\theta_a = \theta_d$ no steering adjustment is necessary; when $\theta_a < \theta_d$, an understeer condition exists, requiring that the amount of tire angle be increased; and when $\theta_a > \theta_d$, an oversteer condition exists requiring that the amount of tire angle be decreased. The direction in which the output gear 24 is rotated is dependent upon which of the values $\theta_a$ and $\theta_d$ is larger, and the amount of rotation of the output gear 24 is dependent upon the magnitude of the difference between the values $\theta_a$ and $\theta_d$. Rotation of the output gear 24 continues until the controller observes that $\theta_a = \theta_d$. Thus, adaptive steering control is provided to correct understeer or oversteer.

Figure 7:
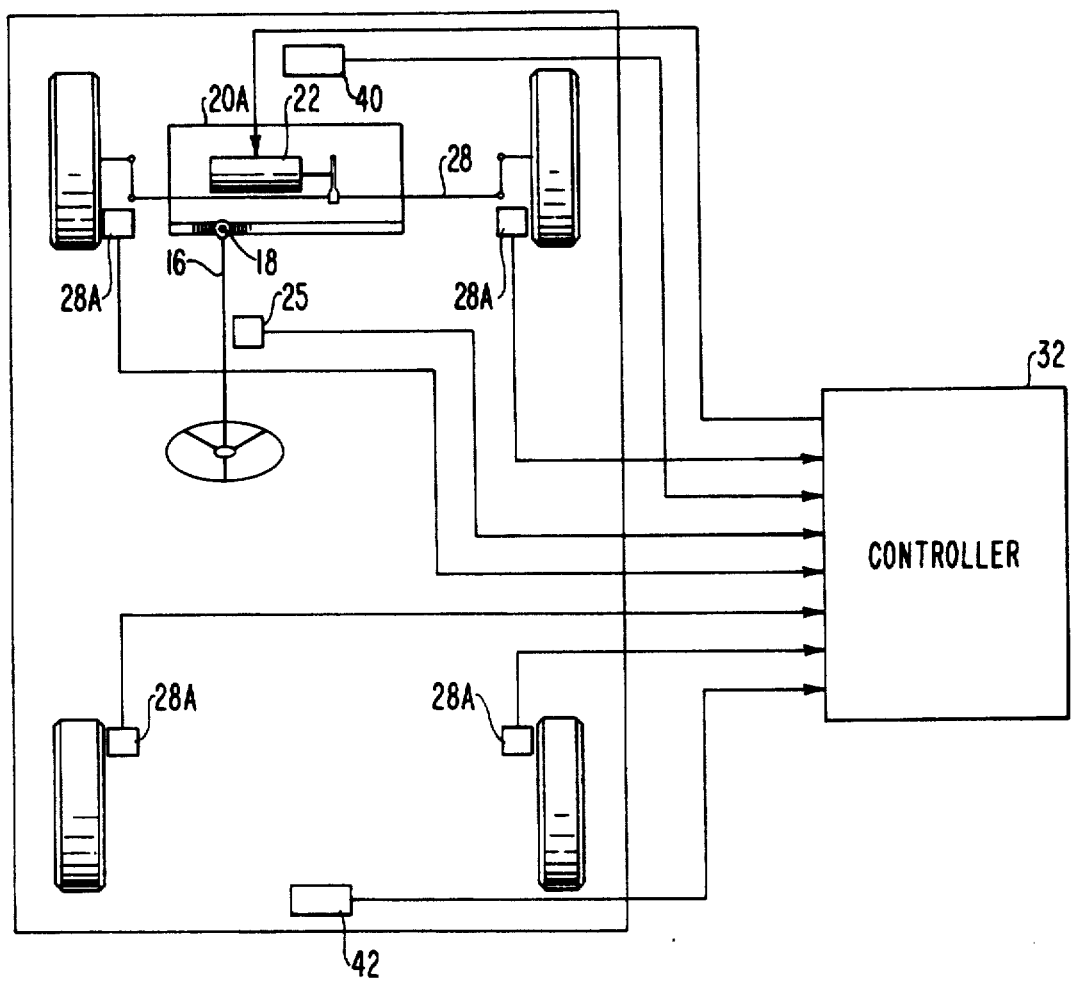
FIG. 7 is a schematic diagram of a second embodiment of a system for controlling the steering apparatus shown in FIG. 4.
Figure 8:
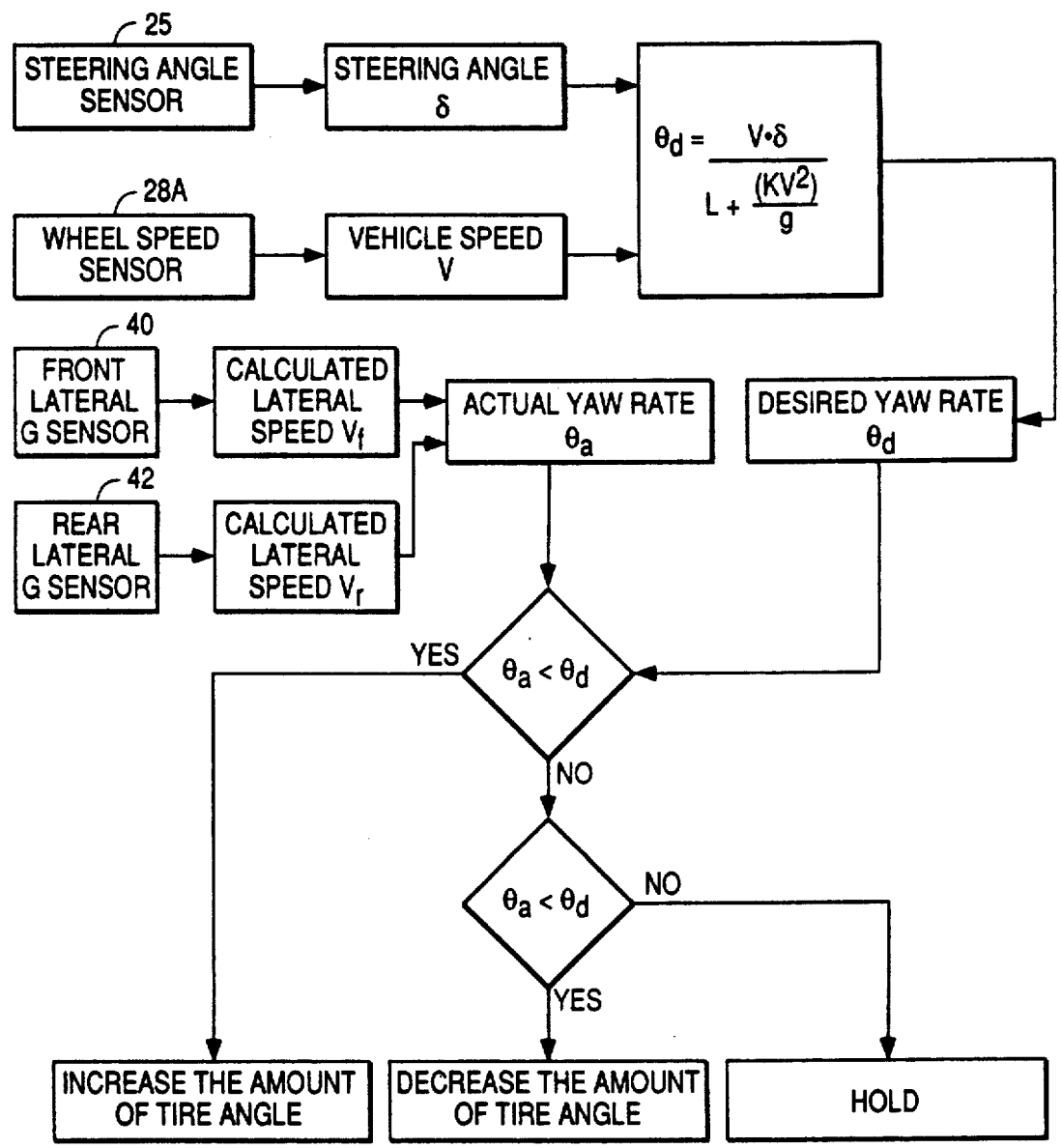
FIG. 8 is a flow chart for the system shown in FIG. 7.

In FIGS. 7 and 8, another preferred embodiment of the control aspect of the present invention is depicted wherein an alternative way of determining actual yaw rate is employed. That is, in lieu of a yaw rate sensor there are employed conventional front and rear lateral acceleration (G-force) sensors 40, 42. The measured front and rear lateral accelerations are converted to front and rear lateral velocity values $V_f$, $V_r$, respectively, by the controller, enabling the actual yaw rate $\theta_a$ to be determined by the following relationship:

$$\theta_a = \frac{V_f - V_r}{N}$$

where N is the distance between the front and rear sensors 40, 42.

Figure 9:
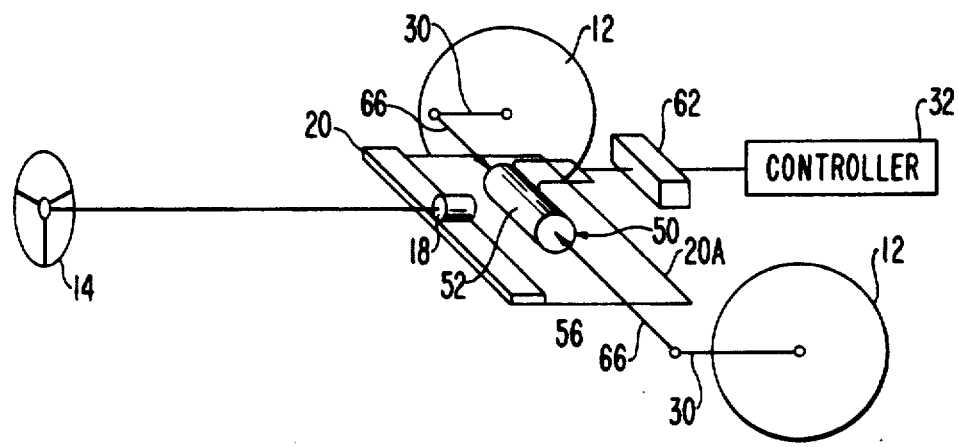
FIG. 9 is a schematic perspective view of a second embodiment of a steering apparatus for steering the steerable wheels of a vehicle in accordance with the present invention in which toe-in control is not provided.
Figure 10:
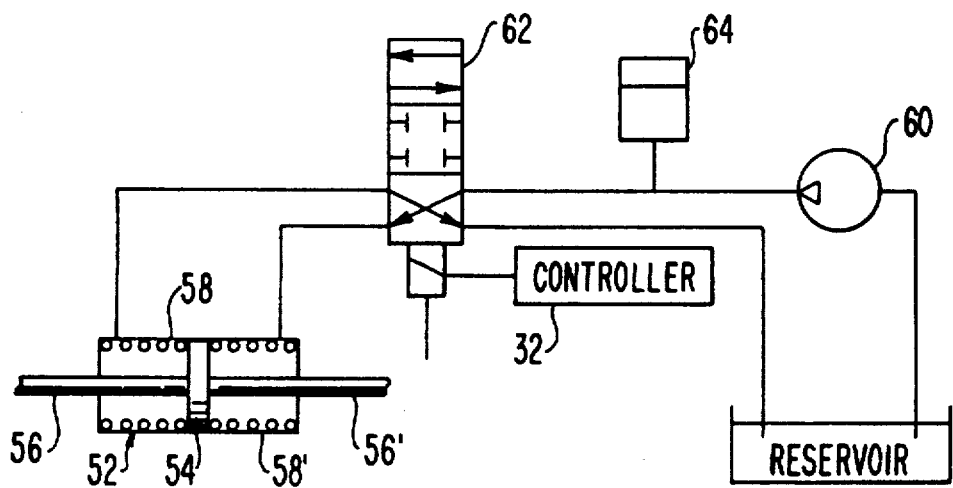
FIG. 10 is a schematic representation of a portion of the steering apparatus of FIG. 9.

In FIGS. 9 and 10, a second preferred embodiment of a steering apparatus aspect of the invention is depicted wherein the electric motor has been replaced by a pressurized fluid motor 50. The fluid motor comprises a fluid cylinder 52 in which is disposed a reciprocable piston 54. A pair of piston rods 56, 56' are connected to opposite sides of the piston 54 and project from opposite ends of the cylinder. A pair of springs 58, 58' disposed within the cylinder bias the piston 54 to a central location within the cylinder 52. A fluid pump 60, operated by the engine, supplies pressurized fluid to a three-way solenoid valve 62, the position of which is determined by a signal from the controller 32. An accumulator 64 can be provided in the fluid line between the pump 60 and the valve 72 to dampen oscillations in fluid pressure.

In operation, steering of the wheels 12 is effected by the steering wheel 14 and the rack and pinion coupling 18, 20. Linear movement of the rack 20 is transmitted to the cylinder 52 which is fixedly mounted on the rack extension 20A. Linear movement of the cylinder is transmitted to the tie rods 66 which are connected to outer ends of the piston rods 56, 56'. In the event that the controller 32 detects an understeer or oversteer condition, the electrically actuable solenoid valve 62 is actuated by an electric output signal from the controller 32 to displace the piston in either of two directions to turn the wheels 12 independently of the position of the steering wheel, thereby making the needed correction in tire angle.

Figure 12:
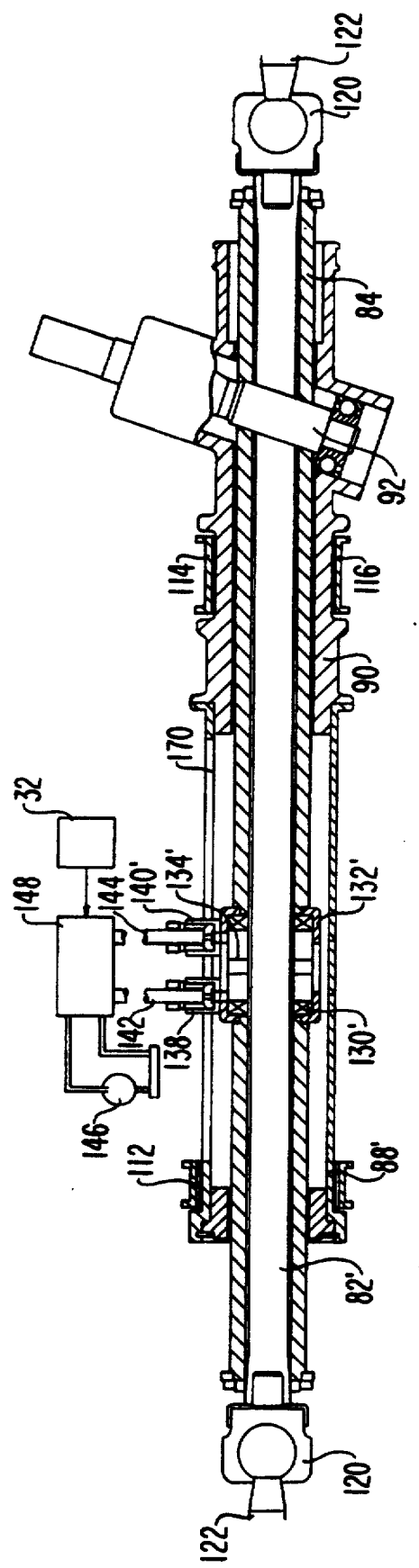
FIG. 12 is a longitudinal sectional view through a second mechanism operating in accordance with the second embodiment disclosed in connection with FIGS. 9–10.

Depicted in FIGS. 11-12 are a number of preferred mechanisms which operate in accordance with the system disclosed in connection with FIGS. 9 and 10. FIGS. 11, 11A and 11B depict one of those mechanisms 80 in which a steering rod 82 is axially slidably mounted in a rack 84 in the form of a hollow cylinder. The rack includes teeth 86 formed on a portion of its outer circumference (see FIG. 11B). The rack 84 is eccentrically arranged relative to the tie rod 82, with the teeth 86 formed on the thicker portion of the rack 84 to thus properly balance the device. The rack 84 is axially slidably mounted in a housing formed by axially aligned power steering housing 88 and steering gear housing 90.

Mounted in steering gear housing 90 is a conventional pinion 92 which is mechanically coupled to the steering shaft. Pinion 92 meshes with the teeth of the rack (see FIG. 11B). Steering gear housing 90 includes power steering valve housing 94 from which a pair of fluid lines 96, 98 extend. Those lines are connected to fittings 100, 102 carried by power steering housing 88 to communicate with power steering chamber 104 on opposite sides of power steering piston 106 disposed in chamber 104. Connected to pinion 92 is a conventional power steering control valve 93 which controls the flow of power steering fluid from a pump (not shown) to a respective one of the lines 96, 98, depending upon the direction in which the steering wheel is turned.

The housing assembly 80 is mounted to a rigid frame 110 of the vehicle by means of a pair of elastic grommets 112, 114. Each grommet is in the form of a hollow cylinder through which a respective part of the housing extends. The grommet 112 receives the power steering housing 88, and the other grommet 114 receives the steering gear housing 90. Each grommet is bolted to the frame 110 by means of a bracket 116. Vibrations of the housing are dampened by the grommets.

Secured to opposite ends of steering rod 82 are ball joints 120 which are attached to the steerable wheels by steering arms 122. Axial displacement of the tie rod 82 in either direction produces a steering of the steerable wheels. The axial displacement of tie rod 82 can be produced by steering pinion 92 which effects an axial displacement of rack 84. Axial displacement of rack 84 is transmitted to tie rod 82 by a mechanism which includes a fluid motor 130. Fluid motor 130 includes a control cylinder 132 connected to rack 84 and piston 134 integrally formed with rod 82. Piston 134 is axially slidable within chamber 136 formed by control cylinder 132. Communicating with chamber 136 on opposite sides of piston 134 are fittings 138, 140 which are coupled to flexible fluid lines 142, 144, respectively. Lines 142, 144 are arranged to receive pressurized fluid from a pump 146 after the fluid passes through valve 148, for example, a tri-positional solenoid valve. Valve 148 is actuated to divert pressurized fluid to one of, or neither of, lines 142 or 144 by controller 32 in the manner discussed earlier herein.

When neither of lines 142 nor 144 is in communication with pump 146, fluid remaining in chamber 136 on opposite sides of piston 134 is able to transmit axial force from control cylinder 132 to piston 134. Thus, axial movement of rack 84 produced by main steering mechanism 92, 106 and by the power steering assembly is transmitted to tie rod 82 through control cylinder 132, the fluid in chamber 136, and piston 134. In other words, fluid in control cylinder 132 prevents tie rod 82 from moving relative to rack 84 when pump 146 is not linked to chamber 136.

In the event that controller 32 determines that the orientation of the steerable wheels should be adjusted in order to prevent excessive oversteer or understeer as discussed with respect to FIGS. 6-8, valve 148 is actuated to direct pressurized fluid from pump 146 to one side of piston 134. As a result, piston 134 is axially displaced relative to control cylinder 132, causing lateral movement of rod 82 with respect to rack 84 and steering the steerable wheels independently of the movement of rack 94.

In order to measure the amount of displacement of tie rod 82 relative to rack 84, which represents the amount by which the tie rod is displaced by controller 32, potentiometer 150 is connected to the tie rod. Potentiometer 150 is of the linear type and includes housing 152 mounted to control cylinder 132 for movement therewith, and rod 154 connected to tie rod 82 by means of bracket 156. Rod 154 is displaced relative to the housing 152 in response to relative displacement between the tie rod and the rack, whereupon the potentiometer 150 generates a signal which is fed back to the controller.

In order to measure the amount of displacement of rack 84, thereby providing an indication of the orientation of the steerable wheels, rotary potentiometer 160 is coupled to pinion 92. A signal generated by the rotary potentiometer is fed back to controller 32.

A preferred mechanism depicted in FIG. 12 is similar to that depicted in FIG. 11, except that no power steering mechanism is provided, and control cylinder 132' of motor 130' is mounted intermediate the axial ends of rack 84. Fittings 138' and 140' are arranged for displacement within a slot 170 formed in housing part 88'. Linear and rotary potentiometers are not depicted, but would be provided. The embodiment according to FIG. 12 operates in the same manner as that disclosed in connection with FIG. 11, the steering forces being transmitted through rack 84 and piston 134' en route to the steering arms.

Figure 13:
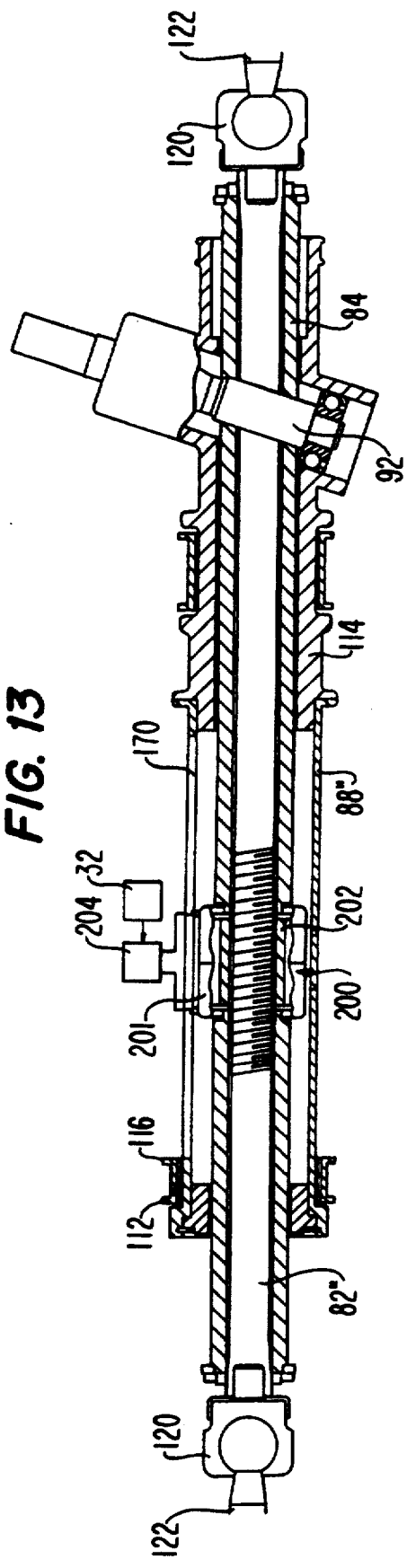
FIG. 13 is a longitudinal sectional view through a mechanism operating in accordance with the embodiment disclosed in connection with FIGS. 4–5.

A preferred mechanism depicted in FIG. 13 is similar to that depicted in FIG. 12 except that in lieu of fluid motor 130', there is provided electric motor 200. Electric motor 200 includes housing 201 connected to rack 84, and an output element in the form of internally threaded rotary nut 202 which is rotated when electric power source 204 energizes a stator of motor 200 in response to a signal from controller 32. Nut 202 meshes with external threading on tie rod 82" in order to axially displace the tie rod relative to rack 84. Although not depicted, potentiometers for measuring the displacement of the rack, and relative displacement between the tie rod and rack would be provided. Steering forces from pinion 92 are transmitted through rack 84 and electric motor output nut 202 en route to the steering arms.

Figure 14:
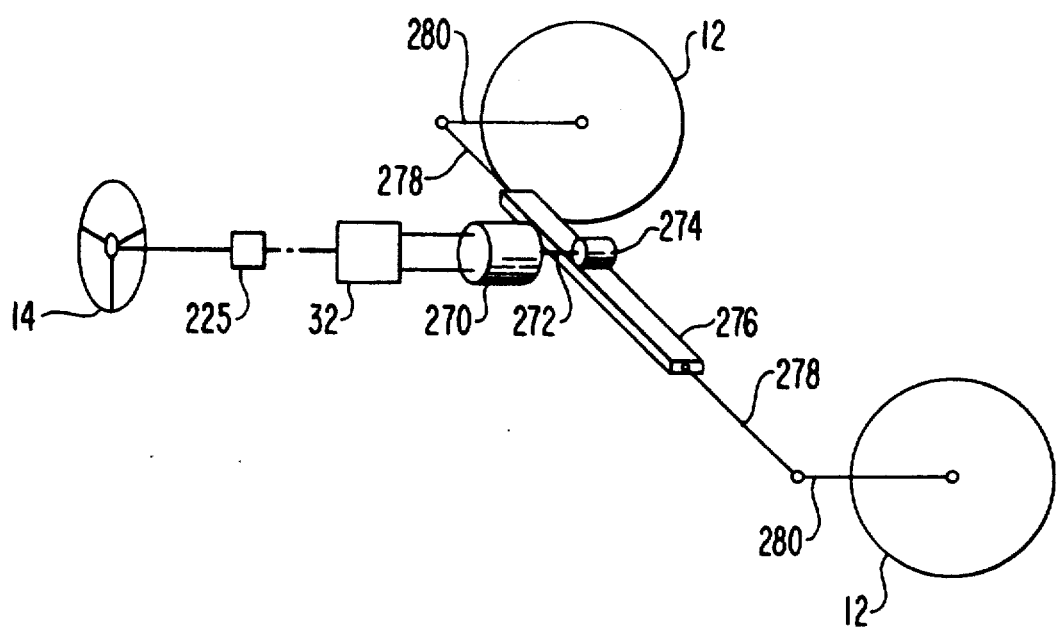
FIG. 14 is a schematic perspective view of a third embodiment of a steering apparatus for steering the steerable wheels of a vehicle in accordance with the present invention in which toe-in control is not provided.

FIG. 14 depicts a third preferred embodiment of the steering mechanism wherein there is no mechanical connection between steering wheel 14 and steerable wheels 12. Rather, the rack and pinion are controlled solely by electrical signals from controller 32. Controller 32 is electrically connected to electric motor 270, output shaft 272 of which is connected to pinion 274. The pinion meshes with the teeth of rack 276, the ends of which are connected to tie rods 278. Tie rods 278 are connected to steering arms 280.

In operation, rotation of the steering wheel 14 results in a signal being generated by steering wheel angle sensor 225. That signal is supplied to the controller in the same fashion as disclosed in connection with FIG. 6. Thus, whenever the steering wheel is turned, the controller will deliver a control signal to motor 70 for turning steerable wheels 12 by an amount which avoids an appreciable oversteer or understeer.

Figure 15:
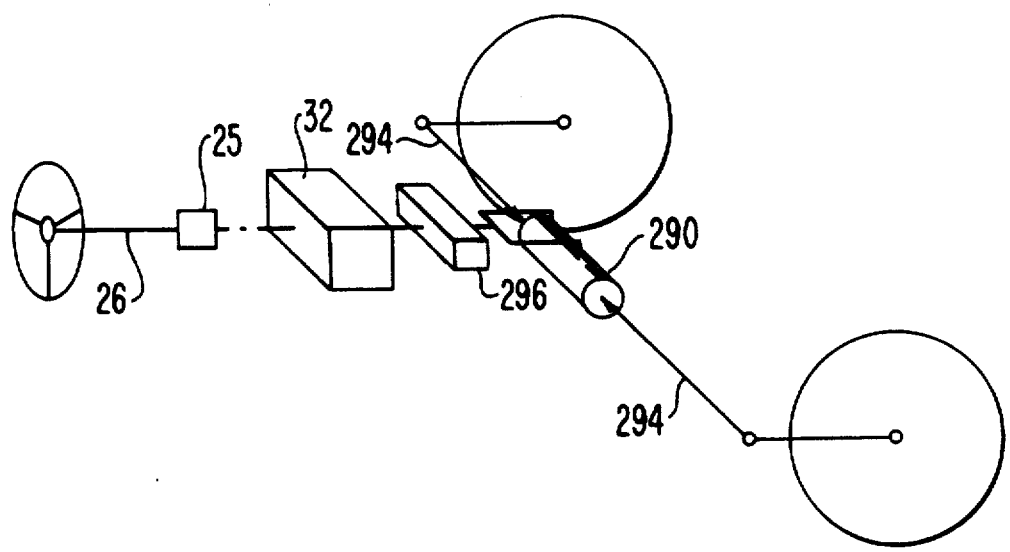
FIG. 15 is a schematic perspective view of a fourth embodiment of a steering apparatus for steering the steerable wheels of a vehicle in accordance with the present invention in which toe-in control is not provided.
Figure 16:
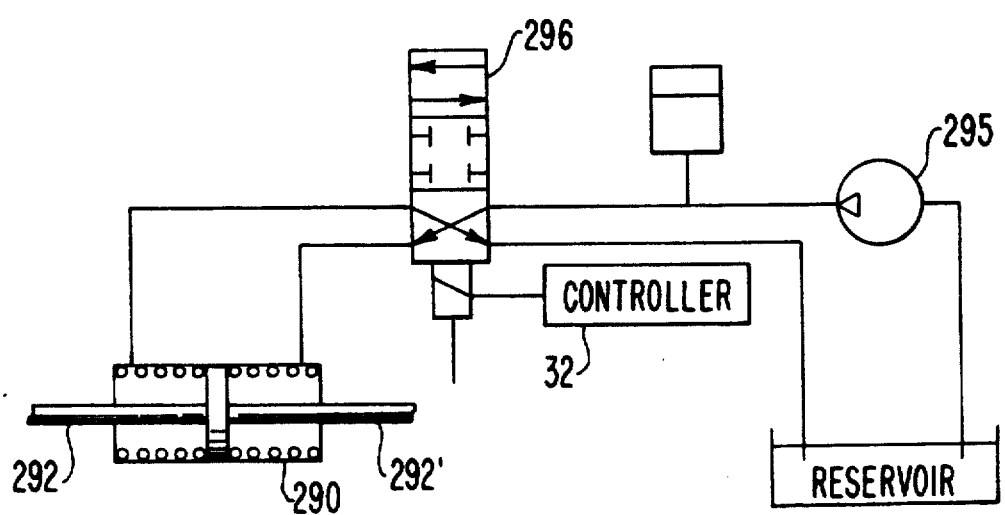
FIG. 16 schematic view of a portion of the steering apparatus of FIG. 15.

FIGS. 15-16 depict a fourth preferred embodiment of a steering mechanism which is a variant of that described above in connection with FIG. 14 in that controller 32 controls a fluid mechanism similar to that described above in connection with FIGS. 9 and 10. That is, fluid cylinder 290 has piston rods 292, 292' connected to tie rods 294. The output signal from controller 32 is delivered to three-way solenoid valve 296 to cause pressurized fluid to be conducted from pump 295 to fluid cylinder 290 to steer steerable wheels 12.

Although the toe-in control mechanism disclosed in FIGS. 1-3 is not shown with respect to the steering control apparatuses disclosed in FIGS. 4-16, it is apparent that these apparatuses could easily be adapted such that the toe-in control mechanism could be used therewith. For example, in any of these embodiments, toe-in control mechanism 707 including cylindrical housing 711 and the associated elements could be disposed between the end of the steering rod and the ball joints for any of these embodiments so as to provide toe-in control. The toe-in control mechanism would be controlled by the same central processing unit which controls the adaptive steering mechanism in each case. Whenever the adaptive steering mechanisms of these embodiments function to prevent excessive understeer or oversteer, fluid pressure would simultaneously be applied to chamber 721 so as to compress elastic member 716, and thereby eliminate toe-in during adaptive steering control.

Figure 17:
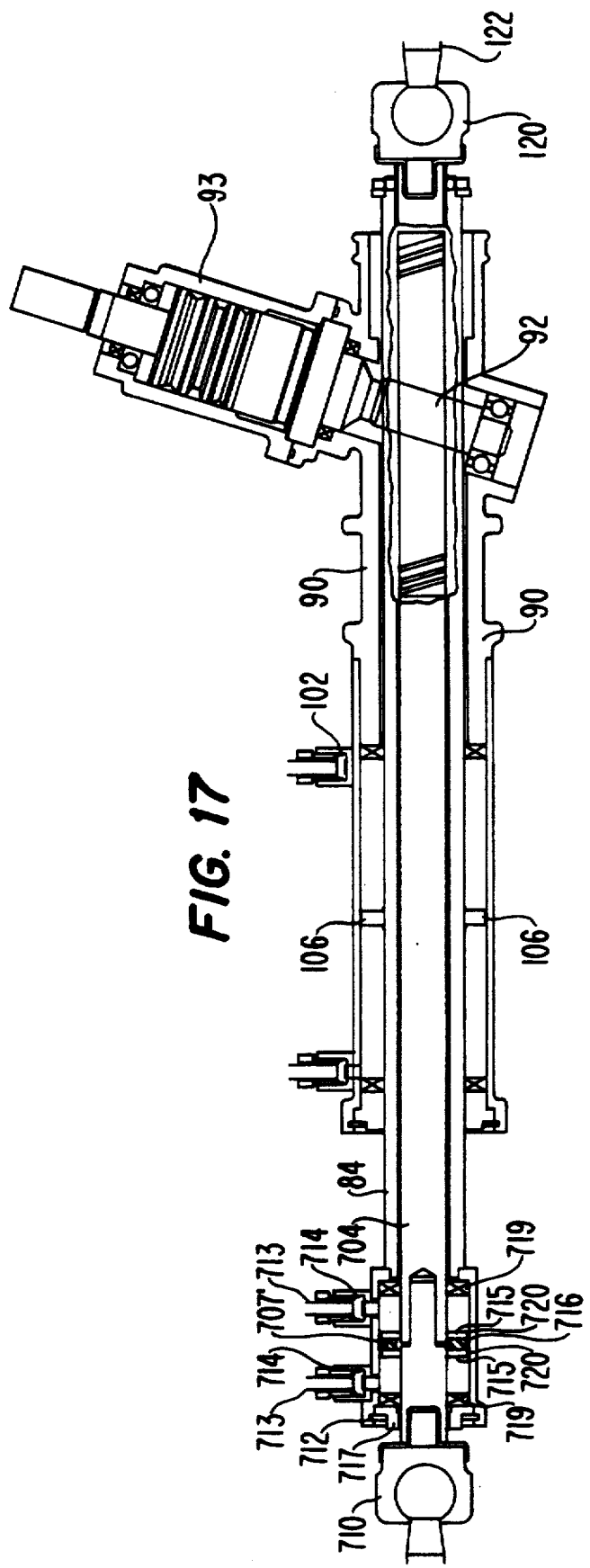
FIG. 17 is a longitudinal sectional view of the mechanism shown in FIG. 11 and further including a third embodiment of the toe-in control mechanism according to the invention which is adapted for use in the steering mechanism shown in FIGS. 11-12.
Figure 18:
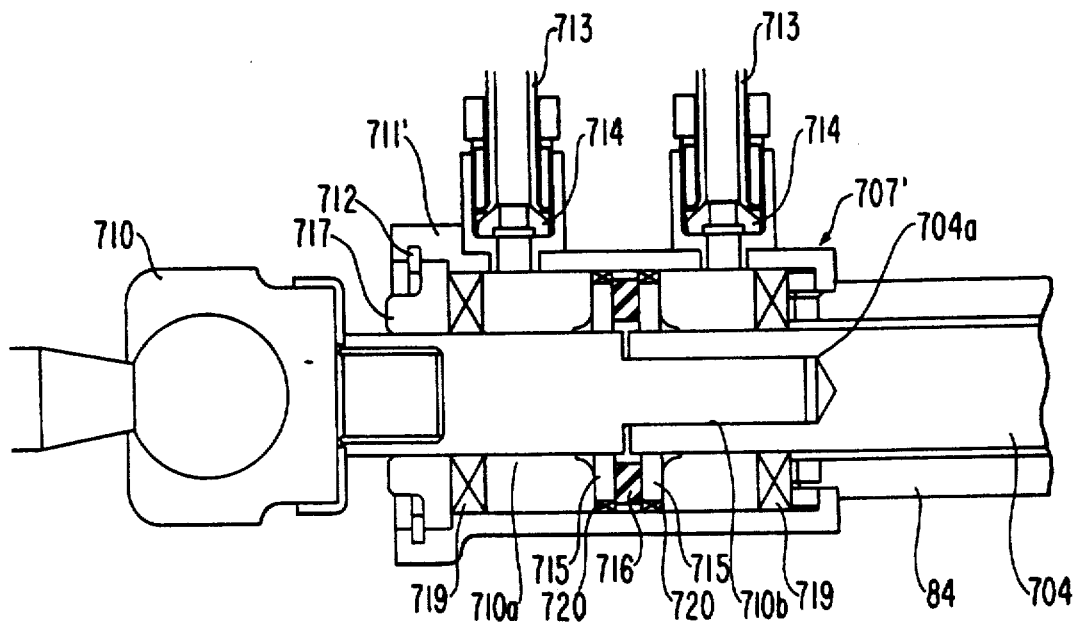
FIG. 18 is a cross-sectional view of the third embodiment of a toe-in control mechanism shown in FIG. 17.

In order to provide toe-in control for the adaptive steering mechanisms disclosed above, toe-in control mechanisms 707 would have to be provided on both ends of the steering rod. With reference to FIGS. 17-18, a toe-in control mechanism is shown which is combined with the adaptive steering control apparatus. In FIG. 17, toe-in control mechanism/adaptive steering control apparatus 707' is disposed at one end of steering rod 704, in place of fluid motor 130 as shown in FIG. 11. In all other respects, the device of FIG. 17 is identical with the device of FIG. 11. Although control mechanism/apparatus 707' is specifically shown as being used with the steering apparatus embodiment of FIG. 11, it could be used with any of the steering apparatuses which make use of fluid pressure to cause lateral movement of the steering rod with respect to the rack during adaptive steering control. Moreover, not only does the use of control mechanism/apparatus 707' provide for both toe-in and adaptive steering control within one cylindrical housing, it also eliminates the need for providing one toe-in control mechanism of the type disclosed in FIGS. 1-3 on each end of the steering rod due to the fact that the steering rod moves freely in the lateral direction with respect to the rack in these adaptive steering apparatuses.

Figure 20:
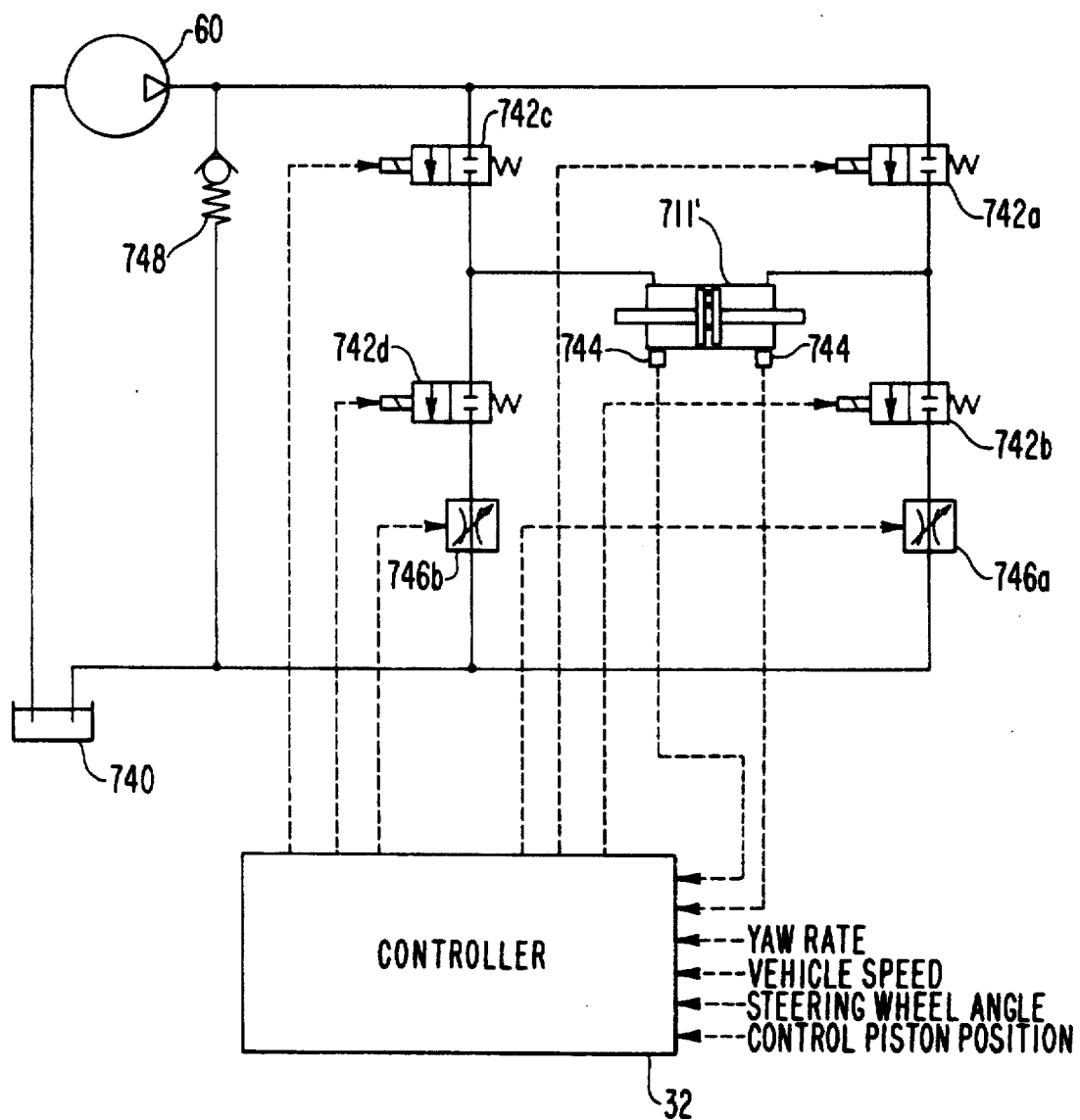
FIG. 20 shows a fluid circuit diagram for controlling the embodiments disclosed in FIGS. 17-19.

With further reference to FIGS. 17-18, steering rod 704 extends within cylindrical housing 711' and linking rod 710a which is fixed to ball joint 710 also extends into cylindrical housing 711'. Cylindrical housing 711' is fixedly disposed at one end of rack 84. Extending portion 710b of linking rod 710a extends within slot 704a formed in the end of steering rod 704. A first piston 715 is fixed to and extends about the periphery of rod 704 at the end thereof, and a second piston 715 is fixed to and extends from linking rod 710a. Elastic member 716 is disposed between the two pistons 715. Pistons 715 divide the interior of cylindrical housing 711' into right and left chambers which are each linked by fluid lines 713 and union seats 714 to control valves 742 as shown in FIG. 20. Seal rings 720 are disposed about pistons 715 as in FIG. 1. Furthermore, first oil seal 719 is disposed adjacent the inner wall of housing 711', and second oil seal 719 is disposed adjacent bushing 717.

With reference to FIG. 20, a fluid circuit for controlling the embodiment shown in FIGS. 17-18 is shown. The circuit includes a first and second pair of serially disposed on/off valves 742a and 742b, and 742c and 742d, respectively, disposed in parallel between oil pump 60 and reservoir 740. The left fluid chamber formed within housing 711' is linked to the fluid circuit between valves 742c and 742d and the right fluid chamber formed within housing 711' is linked to the fluid circuit between valves 742a and 742b. Variable orifices 746a and 746b are disposed between valves 742b and 742d, respectively, and reservoir 740. Relief valve 748 is disposed in a bypass line linked directly between oil pump 60 and reservoir 740, and allows the oil to flow directly therebetween, bypassing the remainder of the circuit including cylindrical housing 711' whenever the pressure at the outlet of oil pump 60 exceeds a predetermined level. Pressure transducers 744 are disposed to detect the fluid pressure within each of the right and left fluid chambers. All of on/off valves 742 and orifices 746 are linked to controller 32 which controls their operating position. Transducers 744 are also linked to controller 32. Finally, controller 32 also receives the yaw rate, vehicle speed, steering wheel angle and relative position of pistons 715 within cylindrical housing 711' from various detectors as discussed with reference to FIGS. 5, 6 and 11.

In operation, during normal straight-ahead driving, valves 742c and 742a remain in the closed position, and pressurised fluid from oil pump 60 flows directly to reservoir 740 through relief valve 748. The pressure on both sides of pistons 715 is essentially equal, and elastic member 716 is not compressed. Therefore, the wheels are configured for toe-in, as shown in FIG. 2a. If the steering wheel is rotated during a turn, the rotation is detected by the steering angle sensor, and controller 32 causes valves 742a and 742c to be in the open position, allowing fluid to flow into both chambers of the cylindrical housing such that they are equally pressurised to a minimum threshold level as detected by transducers 744. The increased pressure acts on both pistons 715 such that the pistons move towards each other, linking rod 710a moves towards steering rod 704 within slot 704a, and elastic member 716 is compressed. Thus, as with the embodiment of FIG. 1, ball joint 710 moves towards housing 711', thereby reducing the overall distance between the steerable wheels along the axis of steering rod 704, and eliminating toe-in of the wheels. The wheels assume a generally parallel configuration. Thereafter, valves 742b and 742a are also opened to ensure that the chambers are not over-pressurised. The flow of fluid out of the chambers such as to ensure that the minimum threshold is maintained and that the chambers are not over-pressurised is controlled by operation of orifices 746a and 746b, which control the flow of fluid out of the chambers under the control of controller 32.

As long as the steering angle sensor detects that the vehicle is being steered through a turn, the pressure in both chambers will be maintained at the minimum threshold level so as to eliminate toe-in. If no understeer or oversteer is detected, that is the actual and desired yaw rates are equal, the vehicle is steered normally with lateral movement of rack 84 transferred to steering rod 704 and linking rod 710a due to the fluid acting on pistons 715. However, should an understeer or oversteer condition be detected as discussed above, one of the interior chambers is further pressurised above the threshold level, causing joint lateral movement of pistons 715 in the same direction, and therefore joint lateral movement of steering rod 704 and linking rod 710a with respect to rack 84, which provides the necessary understeer or oversteer correction. The increased pressurisation of one chamber above the threshold and with respect to the other is accomplished by restriction of the appropriate variable orifice 746a or 746b by controller 32 so as to allow less fluid from the selected chamber to flow therethrough. Thus, the pressure in the chamber is increased above the threshold level and relative to the other chamber, forcing both pistons 715 to move in the lateral direction as necessary to provide the corresponding necessary lateral movement of steering rod 704 and linking rod 710a with respect to housing 711' and rack 84. Of course, since the minimum threshold pressure is maintained in both chambers at all times during adaptive control, elastic member 716 remains compressed between pistons 715, and elimination of toe-in is maintained at all times during adaptive control.

When the desired turning path is achieved, that is, adaptive control is no longer necessary, the chamber in which the pressure has been increased is reduced back to the threshold level by increasing the opening of the orifice. Additionally, the pressure in the other chamber is slightly increased above the threshold level as necessary in order to cause the pistons to return to their central positions within cylindrical housing 711', as adaptive steering control is gradually eliminated. Of course, the pressures in both chambers will be maintained at the threshold level to eliminate toe-in so long as the vehicle is being steered through a turn. When the steering angle sensor detects that the vehicle is no longer being steered through a turn, the pressure in both chambers is reduced to the normal level, elastic member 716 expands and toe-in is restored.

Figure 19:
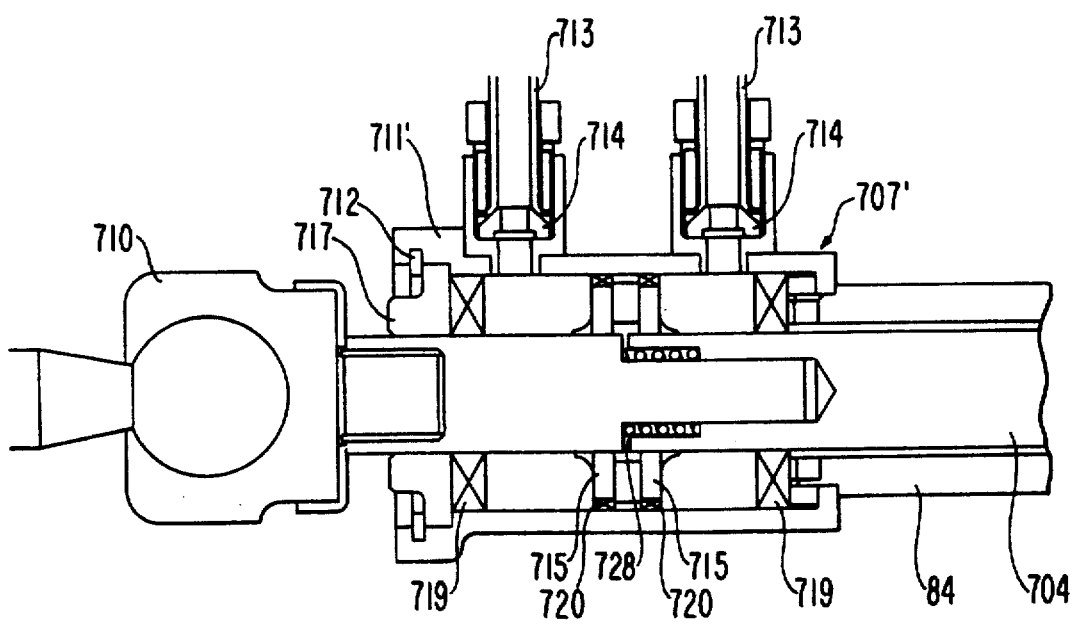
FIG. 19 is a cross-sectional view of a fourth embodiment of toe-in control mechanism which is adapted for use in the steering mechanism shown in FIGS. 11-12.

The embodiment of FIG. 19 is identical to the embodiment of FIG. 18 except that spring 728 is substituted for elastic member 716. Spring 728 is disposed about extending portion 710b of linking rod 710a, within slot 704a formed in steering rod 704. Additionally, it is clear that toe-in control mechanism/adaptive steering apparatus 707' could be substituted for fluid motor 130' shown in FIG. 12. Steering rod 82' would therefore include left and right steering rod portions having ends terminating within the cylindrical housing such that one piston would be fixedly disposed about the end of each rod portion within the cylindrical housing. The operation of the device would be identical with the device shown in FIG. 17.

Although the invention has been described in connection with preferred embodiments thereof, it will be appreciated by those skilled in the art that additions, substitutions, modifications, and deletions not specifically described, may be made without departing from the spirit and scope of the invention as defined in the appended claims.

I claim:

1. A toe-in control mechanism for a vehicle steering apparatus, said apparatus comprising a laterally movable steering rod having ends, the steerable wheels of the vehicle linked to the ends of the steering rod, said toe-in control mechanism comprising:

a housing disposed adjacent to at least one end of the steering rod;

a linking element disposed within said housing and linked at one end to one steerable wheel and at the other end to the steering rod, said linking element movable in the lateral direction relative to the steering rod; and actuating means for causing said linking element to move towards said steering rod whenever the vehicle is caused to turn by the steering mechanism, the movement of said linking element towards the steering rod eliminating toe-in by causing the steerable wheels to be aligned substantially parallel to each other.

2. The mechanism recited in claim 1, one said housing disposed adjacent and fixedly connected to each end of the steering rod, each said housing associated with a linking element and an actuating means.

3. The mechanism recited in claim 2 further comprising:
- a piston fixedly disposed about each said linking element, each said piston defining a fluid chamber on one side thereof within each said housing;
- a compressible element disposed between the second side of said piston and an inner wall of each said housing; and
- said actuating means comprising fluid pressure source means in fluid communication with said fluid chamber for providing fluid pressure to said chamber; wherein, the fluid pressure in said chamber is increased when the vehicle is caused to turn by the steering apparatus such that said pistons moves laterally within said housings, compressing the compressible elements and moving said linking elements towards the steering rod.

4. The mechanism recited in claim 3, said compressible element comprising a spring member.

5. The mechanism recited in claim 3, said compressible element comprising an elastic member.

6. The mechanism recited in claim 1 further comprising:
- a piston fixedly disposed about said linking element, said piston defining a fluid chamber on one side thereof within said housing;
- a compressible element disposed between the second side of said piston and an inner wall of said housing; and
- said actuating means comprising fluid pressure source means in fluid communication with said fluid chamber for providing fluid pressure to said chamber; wherein, the fluid pressure in said chamber is increased when the vehicle is caused to turn by the steering mechanism such that said piston moves laterally, compressing the compressible element and moving said linking element towards a steering rod.

7. The mechanism recited in claim 1, said linking element comprising a linking rod including a portion extending through said housing, said steering rod comprising a slot, extending portion fitting within said slot.

8. The mechanism recited in claim 7, a ball joint fixedly connected to the linking rod at the end opposite said extending portion, said ball joint further linked to the steerable wheel.

9. The mechanism recited in claim 1 further comprising a steering angle sensor means for sensing when the vehicle is caused to turn by the steering apparatus, said actuating means further comprising a central processor receiving an output signal from said steering angle sensor means, said central processor controlling said actuating means to cause said linking element to move.

10. The mechanism recited in claim 1 further comprising a first piston disposed about said linking element, a portion of the steering rod extending into said housing and a second piston disposed about said portion, said first and second pistons defining a first and a second fluid chamber within said housing;
- a compressible element disposed between said first and said second pistons; and
- said actuating means comprising fluid pressure source means in fluid comunication with said first and second fluid chambers for providing fluid pressure to said chambers; wherein, the fluid pressure in both said chambers is increased when the vehicle is caused to turn by the steering mechanism such that said pistons move laterally towards each other, compressing said compressible element therebetween and moving said linking element towards the steering rod.

11. The mechanism recited in claim 10, the steering apparatus comprising an outer housing portion, said housing fixedly disposed on end of the outer housing portion.

12. The mechanism recited in claim 10 further comprising a steering angle sensor means for sensing when the vehicle is caused to turn by the steering apparatus, said actuating means further comprising a central processor receiving an output signal from said sensor means, said central processor controlling said fluid pressure source means to pressurise said chambers.

13. The combination of a steering apparatus and a toe-in control mechanism for a vehicle, said steering apparatus comprising a laterally movable steering rod having ends, the steerable wheels of the vehicle linked to the ends of said steering rod, and steering input means for linking said steering rod to a steering wheel and causing said steering rod to move laterally when the steering wheel is rotated to steer the steerable wheels, said toe-in control mechanism comprising:
- a housing disposed adjacent to at least one end of said steering rod;
- a linking element disposed within said housing and linked at one end to one steerable wheel and at the other end to said steering rod, said linking element movable in the lateral direction relative to said steering rod; and
- actuating means for causing said linking element to move towards said steering rod simultaneously with initiation of lateral movement of said steering rod whenever the vehicle is steered through a turn, the movement of said linking element towards said steering rod eliminating toe-in by causing the steerable wheels to be aligned substantially parallel to each other.

14. The combination recited in claim 13, one said housing disposed adjacent and fixedly connected to each end of said steering rod, each said housing associated with a linking element and an actuating means.

15. The combination recited in claim 14 further comprising:
- a piston fixedly disposed about said linking elements, said piston defining a fluid chamber on one side thereof within said housing;
- a compressible element disposed between the second side of said piston and an inner wall of said housing; and
- said actuating means comprising fluid pressure source means in fluid comunication with said fluid chamber for providing fluid pressure to said chamber; wherein, the fluid pressure in said chamber is increased simultaneously with initiation of lateral movement of said steering rod when the vehicle is steered through a turn, compressing said compressible element and moving said linking means towards said steering rod.

16. The combination recited in claim 13 further comprising:
- a piston fixedly disposed about said linking elements, said piston defining a fluid chamber on one side thereof within said housing;

a compressible element disposed between the second side of said piston and an inner wall of said housing; and said actuating means comprising fluid pressure source means in fluid comunication with said fluid chamber for providing fluid pressure to said chamber; wherein, the fluid pressure in said chamber is increased simultaneously with initiation of lateral movement of said steering rod when the vehicle is steered through a turn, compressing said compressible element and moving said linking means towards said steering rod.

17. The combination recited in claim 13 further comprising a steering angle sensor means for sensing the initiation of lateral movement of said steering rod, said actuating means further comprising a central processor receiving an output signal from said sensor means, said central processor controlling said actuating means to cause said linking element to move towards said steering rod.

18. The combination recited in claim 13 further comprising a first piston disposed about said linking element, a portion of said steering rod extending into said housing and a second piston disposed about said portion, said first and second pistons defining a first and a second fluid chamber within said housing:

a compressible element disposed between said first and said second piston; and said actuating means comprising fluid pressure source means in fluid comunication with said first and second fluid chambers for providing fluid pressure to said chambers; wherein, the fluid pressure in both said chambers is increased simultaneously with initiation of lateral movement of said steering rod such that said pistons move laterally towards each other, compressing said compressible element therebetween and moving said linking element towards said steering rod.

19. A vehicle steering apparatus for providing adaptive steering control and including a toe-in control mechanism, said apparatus comprising:

a movable rack mounted for lateral movement with respect to the vehicle, said rack having a housing fixed at one end;

a steering rod disposed within said rack and laterally movable with and with respect to said rack, one end of said steering rod terminating within said housing;

steering input means for causing said steering rod and said rack to move jointly in the lateral direction during steering control;

a linking element disposed adjacent said one end of said steering rod and within said housing, said linking element further linked to a steerable wheel of the vehicle at the end opposite said steering rod, said linking element and said steering rod movable relative to each other;

actuating means for causing said linking element to move towards said steering rod; and control means for detecting when the vehicle is turning and for measuring an actual steering condition of the vehicle and for determining a desired steering condition of the vehicle, said control means controlling said actuating means to cause said linking element to move towards said steering rod whenever said control means detects the initiation of a vehicle turn to substantially eliminate toe-in, by causing the steerable wheels to be aligned substantially parallel to each other, said control means also causing said steering rod to move relative to said rack in the lateral direction whenever the actual steering condition differs from the desired steering condition, to maintain steering stability by causing said actual steering condition to become substantially equal to said desired steering condition.

20. The apparatus recited in claim 19 further comprising:

a first piston disposed about said steering rod and a second piston disposed about said linking element, both said first and said second pistons disposed within said housing and jointly defining first and second fluid chambers within said housing;

a compressible element operably disposed between said first and second pistons;

said actuating means comprising fluid pressure source means in fluid comunication with both said first chamber and said second chamber for providing fluid pressure to each said chamber; wherein, when said control means detects the vehicle is turning, said control means causes said fluid pressure source means to pressurise both said chambers to a predetermined minimum threshold value so as to cause said pistons to move towards each other and compress said compressible element therebetween, the movement of said pistons causing said linking element to move towards said steering rod, and wherein when said actual steering condition differs from the desired steering condition, said control means causes said fluid pressure source means to futher pressurise one said chamber with respect to the other said chamber thereby causing said steering rod to move relative to said rack to maintain steering stability.

21. The steering apparatus recited in claim 20, said linking element comprising a linking rod having an axial extending portion, said steering rod including an axial slot formed therein, said extending portion disposed within said slot, said compressible element comprising a spring member disposed about said axial extending portion within said slot.

22. The steering apparatus recited in claim 20, said compressible element comprising an elastic member disposed between said pistons.

23. The steering apparatus recited in claim 20, said linking element linked to the steerable wheel by a ball joint fixedly connected to said linking element.

24. The steering apparatus recited in claim 20, said control element measuring the actual yaw rate of the vehicle and determining a desired yaw rate for the vehicle.

25. The steering apparatus recited in claim 24, said control means comprising a steering wheel angle sensor, said sensor detecting both the desired yaw rate and when the vehicle is turning.

26. The steering apparatus recited in claim 19, said control means measuring the actual yaw rate of the vehicle and determining a desired yaw rate for the vehicle.

27. A vehicle steering apparatus for providing adaptive steering control and including a toe-in control mechanism, said apparatus comprising:

a movable rack mounted for lateral movement with respect to the vehicle, said rack including a housing at an intermediate location;

a steering rod disposed within said rack and laterally movable with and with respect to said rack, said steering rod comprising first and second steering rod portions which are moveable relative to each other, one end of each said steering rod portion terminating within said housing, the other end of each said steering rod portion linked to a steerable wheel of the vehicle;

steering input means for causing said steering rod and said rack to move jointly in the lateral direction during steering control;

actuating means for causing said steering rod portions to move towards each other; and control means for detecting when the vehicle is turning and for measuring an actual steering condition of the vehicle and for determining a desired steering condition of the vehicle, said control means controlling said actuating means to cause said steering rod portions to move towards each other whenever said control means detects the initiation of a vehicle turn to substantially eliminate toe-in, by causing the steerable wheels to be aligned substantially parallel to each other said control means also causing both said steering rod portions to jointly move relative to said rack in the lateral direction whenever the actual steering condition differs from the desired steering condition, to maintain steering stability by causing said actual steering condition to become substantially equal to said desired steering condition.

28. The apparatus recited in claim 27 further comprising:
a first piston disposed about said first steering rod portion and a second piston disposed about said second steering rod portion, both said first and said second pistons disposed within said housing and jointly defining first and second fluid chambers within said housing;
a compressible element operably disposed between said first and second pistons;
said actuating means comprising fluid pressure source means in fluid comunication with both said first chamber and said second chamber for providing fluid pressure to each said chamber; wherein,
when said control means detects the vehicle is turning, said control means causes said fluid pressure source means to pressurise both said chambers to a predetermined minimum threshold value so as to cause said pistons to move towards each other and compress said compressible element therebetween, the movement of said pistons causing said first steering rod portion to move towards said second steering rod portion, and wherein when said actual steering condition differs from the desired steering condition, said control means causes said fluid pressure source means to further pressurise one said chamber with respect to the other said chamber thereby causing both said steering rod portions to jointly move relative to said rack to maintain steering stability.

29. The steering apparatus recited in claim 28, said control means measuring the actual yaw rate of the vehicle and determining a desired yaw rate for the vehicle.

30. The steering apparatus recited in claim 29, said control means comprising a steering wheel angle sensor, said sensor detecting both the desired yaw rate and when the vehicle is turning.

31. The steering apparatus recited in claim 28, said first steering rod portion including an axial extending portion, said second steering rod portion including an axial slot formed therein, said extending portion disposed within said slot, said compressible element comprising a spring member disposed about said axial extending portion within said slot.

32. The steering apparatus recited in claim 28, said compressible element comprising an elastic member.

33. The mechanism recited in claim 1 further comprising detecting means for detecting whenever the vehicle is caused to turn by the steering mechanism.

34. The combination recited in claim 13 further comprising detecting means for detecting whenever the vehicle is steered through a turn.

* * * * *